United States Patent
Patoskie

(10) Patent No.: US 10,372,222 B1
(45) Date of Patent: *Aug. 6, 2019

(54) SYSTEM AND METHOD FOR FILTERING CONTENT BASED ON GESTURES

(71) Applicant: OPEN INVENTION NETWORK, LLC, Durham, NC (US)

(72) Inventor: John Patoskie, Allen, TX (US)

(73) Assignee: OPEN INVENTION NETWORK, LLC, Durham, NC (US)

( * ) Notice: Subject to any disclaimer, the term of this patent is extended or adjusted under 35 U.S.C. 154(b) by 451 days.

This patent is subject to a terminal disclaimer.

(21) Appl. No.: 14/719,909

(22) Filed: May 22, 2015

Related U.S. Application Data

(63) Continuation of application No. 14/471,105, filed on Aug. 28, 2014, now Pat. No. 9,053,193, which is a continuation of application No. 13/078,935, filed on Apr. 2, 2011, now Pat. No. 8,825,643.

(51) Int. Cl.
*G06F 16/9535* (2019.01)
*G06F 3/01* (2006.01)
*H04L 29/08* (2006.01)
*G06F 16/955* (2019.01)

(52) U.S. Cl.
CPC ............ *G06F 3/017* (2013.01); *G06F 16/955* (2019.01); *H04L 67/10* (2013.01)

(58) Field of Classification Search
None
See application file for complete search history.

(56) References Cited

U.S. PATENT DOCUMENTS

| | | | | |
|---|---|---|---|---|
| 2006/0093998 A1* | 5/2006 | Vertegaal | ............... | G06F 3/011 434/236 |
| 2012/0192069 A1* | 7/2012 | Zhang | ................. | G06F 9/45512 715/704 |
| 2012/0192112 A1* | 7/2012 | Garrison | .............. | G06F 3/0482 715/825 |
| 2012/0197986 A1* | 8/2012 | Chen | ...................... | G06Q 30/00 709/204 |
| 2012/0209907 A1* | 8/2012 | Andrews | ........... | G06F 17/30867 709/204 |
| 2012/0210200 A1* | 8/2012 | Berger | ................ | G06F 3/04845 715/202 |
| 2012/0216114 A1* | 8/2012 | Privault | ............. | G06F 3/04883 715/702 |
| 2012/0233076 A1* | 9/2012 | Sutcliffe | ................ | G06Q 30/02 705/50 |
| 2012/0313900 A1* | 12/2012 | Dahl | ....................... | G06F 3/043 345/177 |
| 2014/0157142 A1* | 6/2014 | Heinrich | ............ | H04L 67/1095 715/744 |

* cited by examiner

*Primary Examiner* — Wilson Lee

(57) ABSTRACT

In order to provide filtering of content to be presented on a mobile device, a gesture-based preferencing system and method may be employed. When content is presented to a user, the user may indicate a positive or negative preference toward that content by making a gesture. The gesture may be detected by a motion sensor and the preference of the content indicated by the gesture may be stored in a preference datastore. The preference may be used to subsequently filter content that is to be presented to the user.

20 Claims, 5 Drawing Sheets

1

SYSTEM AND METHOD FOR FILTERING CONTENT BASED ON GESTURES

CROSS REFERENCE TO RELATED APPLICATIONS

This application claims priority of and is a continuation of U.S. Ser. No. 14/471,105, entitled SYSTEM AND METHOD FOR FILTERING CONTENT BASED ON GESTURES, filed on Aug. 28, 2014, now issued U.S. Pat. No. 9,053,193, issued on Jun. 9, 2015, which is a continuation of U.S. Ser. No. 13/078,935, entitled SYSTEM AND METHOD FOR FILTERING CONTENT BASED ON GESTURES, filed on Apr. 2, 2011, now issued U.S. Pat. No. 8,825,643 issued on Sep. 2, 2014, incorporated herein by reference in their entirety.

FIELD OF THE INVENTION

This disclosure relates to the provision of content to mobile devices and in particular to systems and methods for filtering content.

BACKGROUND OF THE INVENTION

As more information is made available to mobile devices, a better method of filtering and storing preferences is required that minimizes user involvement. Users of mobile devices can be selective about the content that is displayed on their device, in particular unsolicited content such as advertisements, coupons, surveys, etc. However, to indicate their preferences for such content, the user is typically required to perform various menu driven settings, which can be difficult to navigate and time consuming.

Existing technology requires users to navigate through a series of screens selecting through a list of menu items, toggling to enable/disable a choice or accepting/declining options via one or more physical or virtual button presses to determine filtering criteria (preferences). These preferences are applied to a result set of data offered to the mobile device.

What is required is an improved system and method for determining content preferences.

SUMMARY OF THE INVENTION

In order to provide filtering of content to be presented on a mobile device, a gesture-based preferencing system and method may be employed. When content is presented to a user, the user may indicate a positive or negative preference toward that content by making a gesture. The gesture may be detected by a motion sensor and the preference of the content indicated by the gesture may be stored in a preference datastore. The preference may be used to subsequently filter content that is to be presented to the user.

In one aspect of the disclosure, there is provided a method for recording a content preference for content to be presented in a mobile device. Content is received into the device and parsed to determine one or more content parameters of the first content. The content is then presented to a user of the device, e.g. by display, audio, etc. A user gesture is recorded and analyzed to determine a content-related preference from the gesture. The preference is associated with one or more of the content parameters and stored in a preference datastore.

The method may further comprise filtering content received into the device, in which parameters of the received content as used as a lookup to the preference datastore. Retrieved preferences may then be applied to the content to filter the content so that filtered content may be presented to the user.

In one aspect of the disclosure, there is provided a mobile device configured for communications with a data network and to receive content from the data network. The mobile device may be provided with motion sensing capabilities and an application executable on at least one processor of the mobile device. The application may be configured to present content to a user of the mobile device, record a gesture-based preference in respect of the content, and store the gesture-based preference.

BRIEF DESCRIPTION OF THE DRAWINGS

Reference will now be made, by way of example only, to specific embodiments and to the accompanying drawings in which.

DETAILED DESCRIPTION OF THE INVENTION

In the Applicant's patent application Ser. No. 13/078,938 there is described a system and method directed toward utilizing gestures and available (external) resources to improve the experience with the content received into a mobile device by redirecting the content to remote devices. The present disclosure is directed toward filtering the type of content that a user displays on their device.

Figure 1:
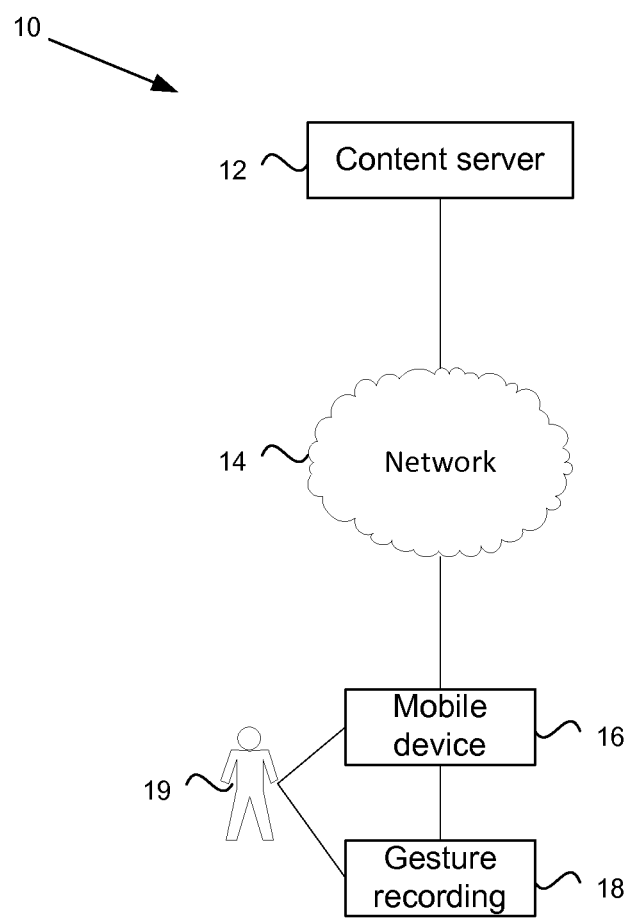
FIG. 1 depicts a mobile communications system.

In FIG. 1, there is shown a system 10 on which the gesture-preferences based methods may be implemented. The system includes a content server 12, such as an ad server, that provides content through a network 14 to users 19 at one or more mobile devices 16. The mobile device 16 may be a network enabled device configured to receive the content, such as a mobile phone, smartphone or similarly web-enabled device. The mobile device 16 may also be tablet computer, netbook or similar mobile computing device. Also provided may be a gesture recording device 18. The gesture recording device 18 may be integrated with the mobile device 16, such as an accelerometer or similar motion sensor. Alternatively or in addition, the motion sensor 18 may be a non-integrated device that is locally paired with the mobile device 18, e.g. via a short-range communications protocol such as Bluetooth. Non-integrated motion sensors may include accelerometers, gyroscopes, or devices for measuring eye movements. As will be described in greater detail below, the mobile device 16 may execute an application that enables a user 19 to provide a gesture on the mobile device 16 or associated gesture sensor 18 towards the type of content presented so that a future filter towards that content or similar content can be applied.

Figure 2:
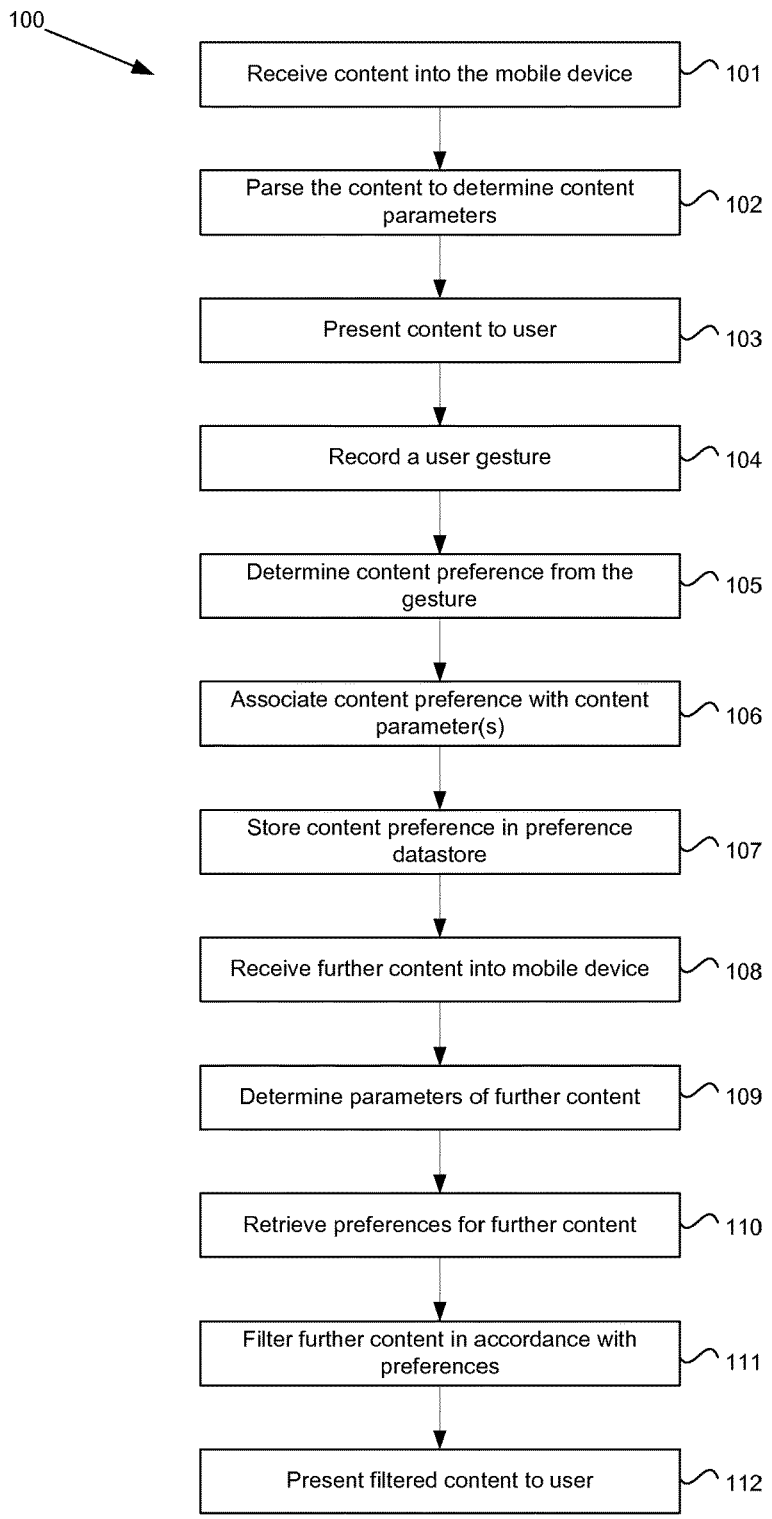
FIG. 2 depicts a process for filtering content to a mobile device.

A process for filtering the content received into the mobile device 16 is depicted in the flowchart 100 of FIG. 2. Initially, content is received from the content server 12 into the mobile device 16 (step 101). The mobile device parses the content to determine one or more content parameters 102 and the content is presented to the user 19 (step 103). At step 104, a user gesture is recorded with the gesture recording device 18 and a content-related preference is determined from this gesture (step 105). The content parameters are associated with the gesture 106, with the association being stored in a preference datastore (step 107). When further content is received into the mobile device 16 (step 108), the further content is parsed to determine the content parameters (step 109). This additional content may have been received as part of the initial (step 101) interaction or as separate interaction at a different time. The content parameters may then be provided to the preference datastore to retrieve preferences in relation to the further content (step 110). Any retrieved preferences are then applied to the further content to filter the further content (step 111) before the filtered content is presented to the user 19 (step 112).

Figure 3:
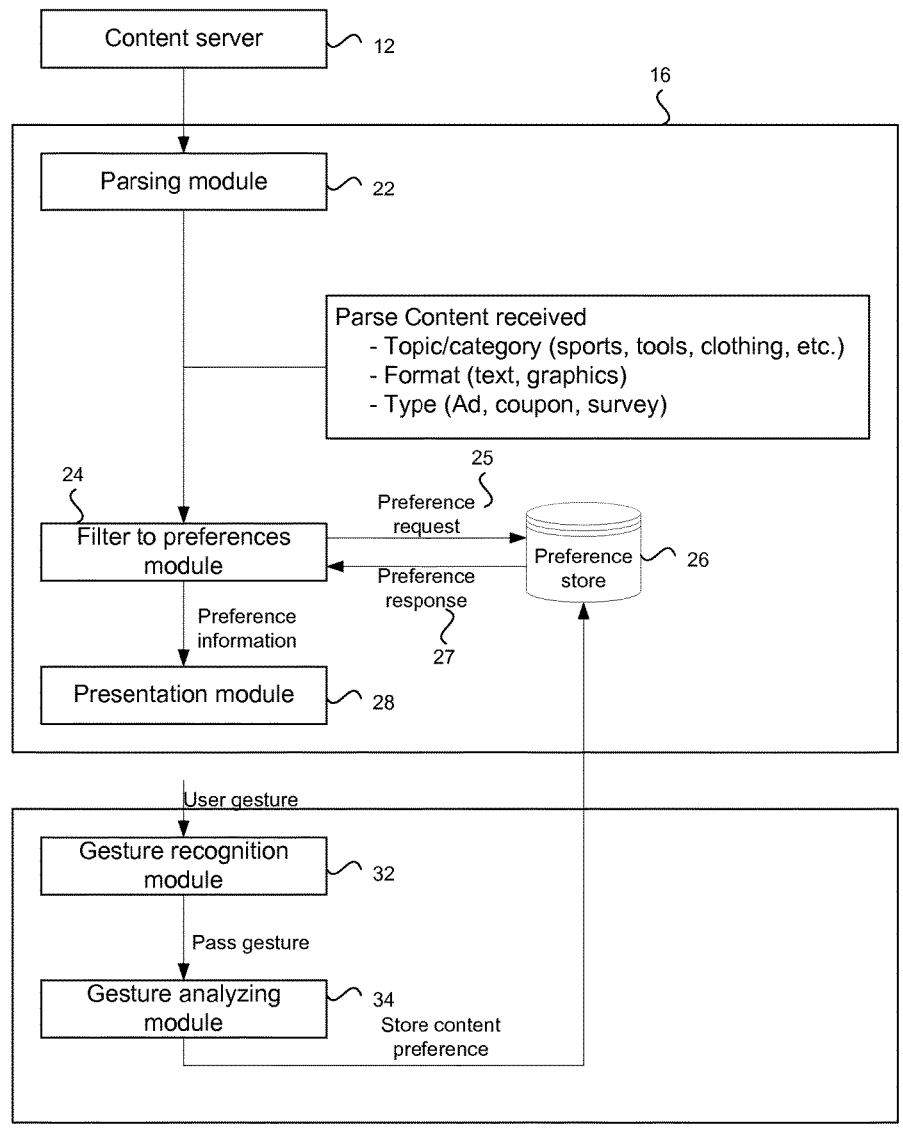
FIG. 3 depicts a mobile device configured to record gesture-based preferences.

The mobile device 16 is shown in more detail in FIG. 3. The mobile device 16 includes a parsing module 22 that initially receives the content from the content server 12. The parsing module 22 parses the meta-data provided with the content to determine the parameters of the content. Parameters may include, without limitation, a topic or category (such as sports, tools, clothing, etc.), a content format (such as text, graphics), a content type, (e.g. ad, coupon, survey). The meta-data can be in a defined structure, such as name/value pairs or keyword listings. From the meta-data, the parsing module associates characteristics to the content by which a preference can be applied. For example, the parsing module could use the meta-data to assign parameters to the content of a topic of sports, presentation method of graphic image, and of type ad. Other content could have meta-data that the parsing module assigns parameters of a topic of sports, presentation method of graphic image but this time of type coupon.

The parsing module 22 passes the parsed content to a filter preferences module 24. The filter preferences module 24 provides a preference request 25 to a preference datastore 26. The preference datastore may be an integrated memory of the mobile device 16, as shown in FIG. 3. Alternatively, the preference datastore may be an off-device datastore accessed via the network 14 (FIG. 1). The preference datastore 26 uses the content parameters as a lookup to determine whether any preferences exist for those content parameters. Any preferences retrieved are provided from the preference datastore 26 to the filter preferences module 24 in a preference response 27.

The filter preferences module 24 applies any retrieved preferences to filter the received content. The filtered content is then provided to a presentation module 28 that presents the filtered content to the user 19, e.g. via a screen display or the mobile device or by audio through the speakers of the mobile device 16.

Figure 4:
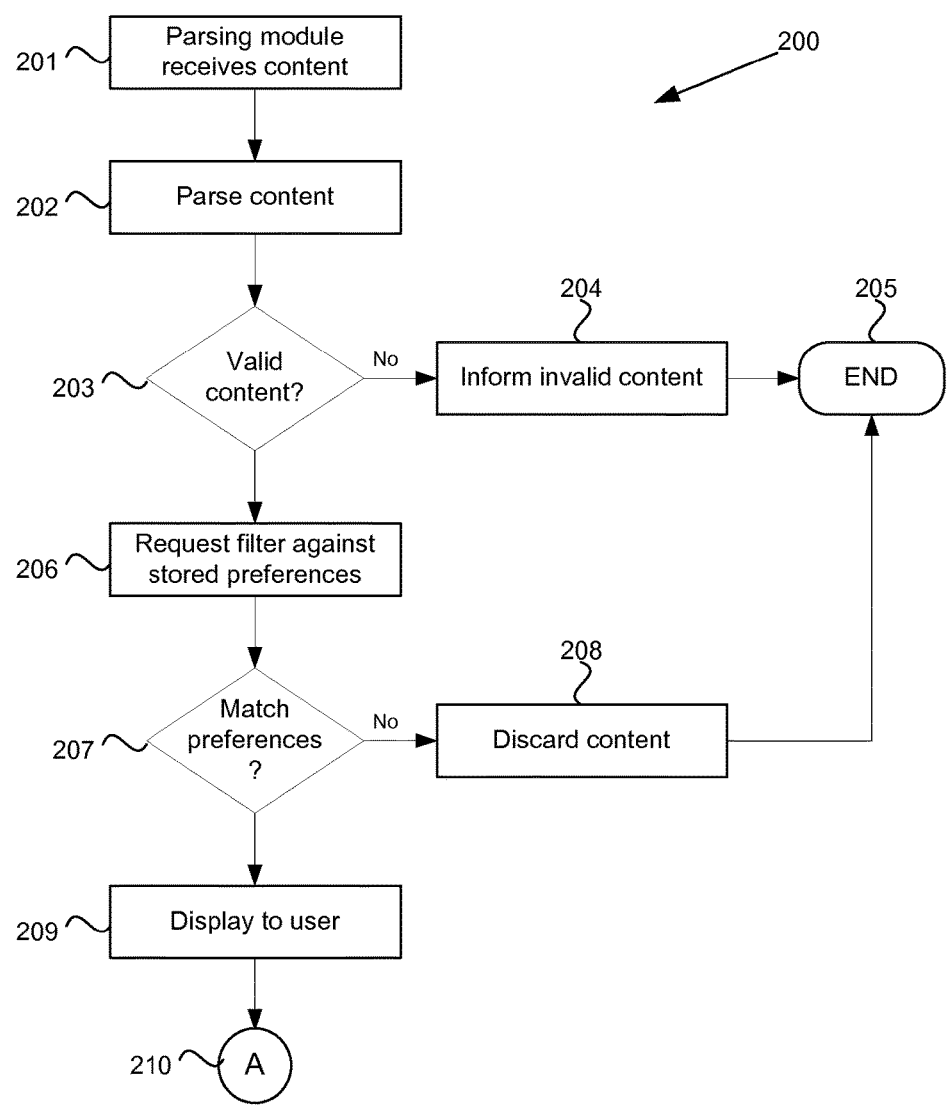
FIG. 4 depicts a process for filtering content.

The filtering process is shown in more detail in the flowchart 200 of FIG. 4. At step 201, the parsing module 22 receives the content which is then parsed at step 202. If the content is invalid (determination 203), the user is informed (step 204) and the process ends 205. If the content is valid, the filter preferences module 24 provides a preferences request to the preferences datastore 26 that requests any filters that match the content parameters. The initial configuration of the preferences datastore 26 allows users to assign a preference to content parameters and/or learn based on usage. For example, the mobile device may request initial preferences toward a topic (sports—positive, negative, none), toward a format (graphics—positive, negative, none), and toward a type (ad—positive, negative, none). Defaults may also be assigned to match all options within a parameter. For example, positive for all topics. If conflicts occur between parameters, the filter to preferences module can be set to prompt the user for a preference or learn based on previous preference responses indicating high probability of positive or negative responses. The filter preferences module applies the filters and if the content does not satisfy the positive or negative preferences for the content to be passed, (determination 207), then the content is discarded (step 208). However, if the content matches the preferences, then the content is displayed or otherwise presented (e.g. via audio) to the user (step 209). Once presented, the user may invoke a gesture-based preference recording process, represented by step 210.

Figure 5:
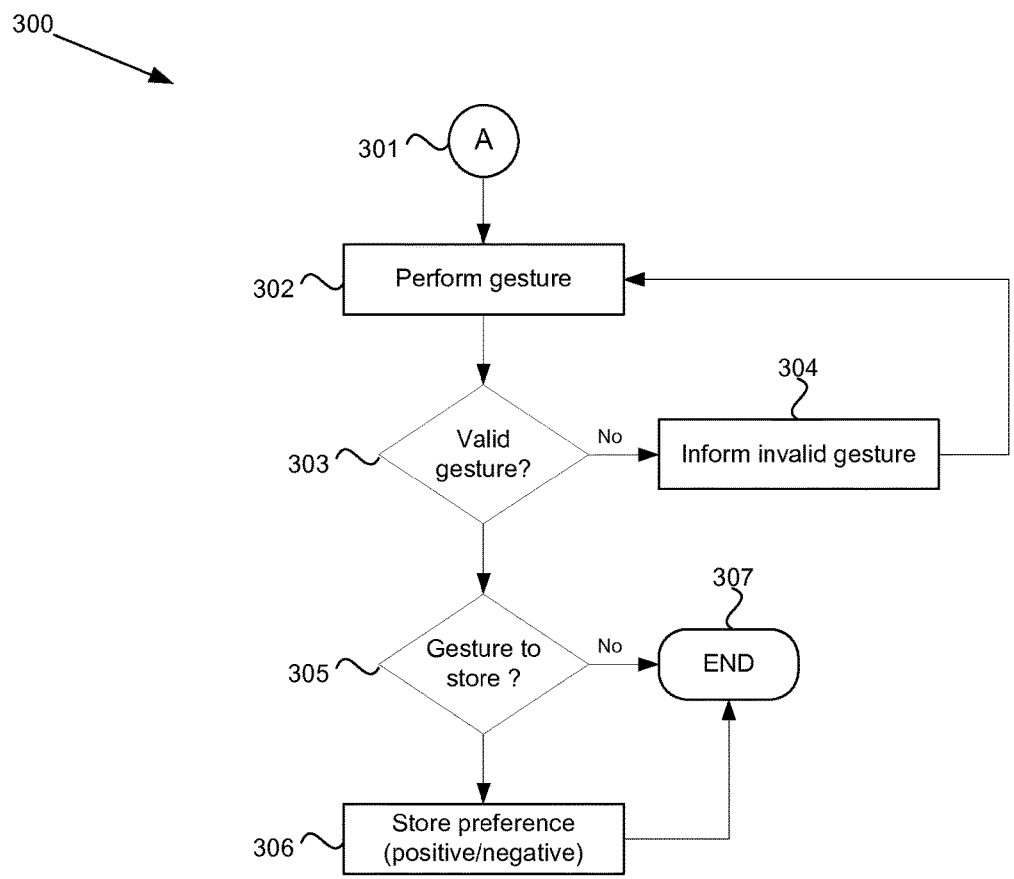
FIG. 5 depicts a process for recording gesture based preferences.

An example of a gesture-based preference recording process is depicted in the flowchart 300 of FIG. 5. When the user is presented with the content, the user may invoke the preference recording process in order to record a filter for the content. After invoking the gesture process (step 301), the user performs a gesture (step 302) which is detected by the gesture recognition module 32. If the gesture is not valid (determination 303), the user is informed 304 and allowed to re-perform the gesture. If the gesture is valid, the gesture is passed to a gesture analyzing module 34 which determines whether the gesture indicates a preference to store, for example whether the gesture is a positive or negative preference in respect of the content (decision 305) or whether the gesture indicates ignore/skip storing a preference (e.g. where a user may have thought they wanted to make a gesture only to change their mind).

The positive or negative preference for the content is then stored in the preference datastore 26 (step 306) so that this preference may be applied to subsequent content and then the process terminates 307

The gesture recognition module 32 may be built into the mobile device 16. The gesture is initiated by a command (either a button push or a vocal command). In one embodiment, the gesture (after initiated) is a movement of the device itself that may be recorded by the gesture recognition module 32. The gesture recognition module 32 may include a motion sensor, such as an accelerometer, digital compass, etc., as well as processing circuitry for interpreting the output of the motion sensor as a gesture. Examples of motion that could be interpreted as a gesture include slow shaking left to right vs. slow shaking up and down. Additional gestures could include a long movement in a particular direction, move and hold for a period of time in a particular direction or movement in the form of an arc vs. straight line. A gesture is a repeatable distinct movement that can be interpreted as including one or more responses.

The gesture recognition module 32 determines if a gesture has occurred. This includes detecting some motion and assigning properties to the motion or action. These properties may include direction, time, distance and angle. Once the properties can be determined, the properties are passed from the gesture recognition module 32 to the gesture analyzing module 34.

The gesture analyzing module 34 receives the gesture and associates it with content parameters of the content that has been presented to the user. The gesture analyzing module 34 takes a set of properties related to a gesture and determines if they correspond to a valid gesture on record. In this regard, the gesture analyzing module may include a gesture store that associates gestures with indications. The gesture store may have a predefined list of gestures that represent a preference. Alternatively or in addition, the gesture analyzing module 34 may provide an interface that allows the user to configure how gestures are associated with indications and actions. For example, side to side motion may be defined as a negative preference indication. A gesture indicating up and down movement may be defined as a positive preference indication.

In one embodiment, the motion sensor may be a separate device that is locally paired with the mobile device 16, e.g. via Bluetooth or some similar communication protocol, that enables the output of the motion sensor to be analyzed by the gesture analyzing module 34 within the mobile device. In one embodiment, the locally paired device may be a device for measuring eye movements. Tracking of eye movement could occur using sensors in specially adapted glasses worn by a user while viewing information and communicated back to the mobile device. For example, a pair of sun glasses which can track eye movement can communicate such movement to a mobile device using Bluetooth technology. When a user is presented an ad, the user's eye movements could drift down to indicate a negative preference to the ad. The mobile device will record the preference as if the gesture occurred on the mobile device. A positive/favorable preference could be indicated by looking up while the ad is visible. The content server 12 provides content to the mobile device 16 via the network 14 in a known and conventional manner. While a gesture can be the movement of the mobile device, the gesture could also be the amount of time a user's eyes remain on the particular components of the content.

In one embodiment, gestures may be divided into degrees that can be used to rank the strength of a preference. For example, a strong/fast movement could be of higher rank toward a preference. Ranked preferences may be used to provide a higher degree of granularity in the filtering process. For example, a user may provide a strong preference against graphics content but a lower ranked preference toward sport content. Thus, the filter preferences module 24 would be able to decide that content containing sports images would not be presented to the user while sports text content would be presented.

To minimize user interaction, the gesture is typically all that is needed to determine a preference. As more preferences are collected, the system can determine possible "habits/interests" for future information (e.g. the user seems to respond negatively to clothing ads without coupons sent only in text format). This gives the user control over the content that is displayed to them independently of $3^{rd}$ party involvement, such as from the ad content provider. A system in which user preferences were communicated to an ad server, thereby enabling the ad server to filter the content that was pushed to the user is known. The disadvantage of such as a method is that it reduces the privacy of the user. The present method allows the ad server to continually publish the same content and let the receiver remain anonymous and filter the content locally. The preferences maintained in the mobile device under the present methods may be significantly more detailed.

The embodiments described above allow users of mobile devices to quickly and easily filter relevant information such as advertising or product availability based on simple gestures. There is a gain in how the user enters area-of-interest/preferences info, and in filtering (by area of interest and preferences) the wide array of information (e.g. advertisements) down to the most relevant info. This minimizes the amount of information displayed to the user.

By continuously applying the user's preferences to subsequent content, the preference filters may continually adapt and evolve so that ultimately, only the exact content that the user desires will be presented to the user.

The components of the system 10 may be embodied in hardware, software, firmware or a combination of hardware, software and/or firmware. In a hardware embodiment, the gesture-based preferencing application may be executed on a processor of the mobile device. The application may be stored as a set of executable instructions in a memory of the mobile device that is operatively associated with the processor.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method for filtering and storing preferences to minimize user involvement, comprising:

presenting first content to a user of a mobile device, the first content related to one or more first content parameters comprising a topic or category, a content format comprising a designation of one of text or graphics, and one of an advertisement, a coupon, or a survey;

recording a user gesture with at least one gesture recording device associated with the mobile device, the user gesture initiated by a command;

determining one of a positive or a negative content-related preference and a strength of the preference from the user gesture, the strength of the preference corresponding to a speed of the user gesture;

storing the one of a positive or negative content-related preference;

associating the content related preference with the one or more first content parameters;

presenting second content to the user of the mobile device;

filtering the second content in accordance with a retrieved one or more preferences related to one or more second content parameters, the second content related to one or more second content parameters comprising a topic or category, a content format, and one of an advertisement, a coupon, or a survey; and presenting the filtered second content to the user of the mobile device.

2. The method of claim 1 wherein the content related preference comprises a positive preference reflecting the user's desire to receive content corresponding to the content-related preference, and wherein filtering the second content comprises applying the positive preference to determine content to present to the user.

3. The method of claim 1 wherein the content related preference comprises a negative preference reflecting the user's desire to not receive content corresponding to the content-related preference, and wherein filtering the second content comprises applying the negative preference to determine content to not present to the user.

4. The method of claim 1 wherein determining the content-related preference comprises receiving an input from the user of the mobile device in association with the gesture that indicates the content-related preference.

5. The method of claim 1 comprising:
storing the association in a preference datastore;
retrieving one or more content-related preferences from the preference datastore in respect of the one or more parameters of the first content;
filtering the first content in accordance with the one or more content-related preferences; and
presenting filtered first content to the user.

6. The method of claim 1 comprising:
recording a second gesture in respect of the filtered second content, the second gesture indicating a preference in respect of the filtered second content; and
storing the preference for the filtered second content as indicated by the second gesture.

7. The method of claim 1 comprising selecting to execute, by the user, a preference recording application, in response to presenting filtered first content to the user.

8. The method of claim 7 wherein the preference recording application enables a user to record a gesture-based preference.

9. The method of claim 5 wherein the preference datastore comprises a memory of the mobile device.

10. The method of claim 1 wherein recording a user gesture comprises recording motion of the mobile device.

11. The method of claim 1 wherein recording a user gesture comprises recording motion of a non-integrated device separate from and in communication with the mobile device.

12. The method of claim 11 wherein recording a user gesture comprises recording eye movement of the user.

13. The method of claim 1 wherein recording a user gesture comprises recording a degree of movement.

14. The method of claim 13, comprising ranking a preference based on the degree of movement.

15. The method of claim 5, comprising providing the one or more second content parameters to the preference datastore.

16. A method for filtering and storing preferences to minimize user involvement, comprising:
receiving content into a mobile device;
determining one or more content parameters of the content, the one or more content parameters comprising a topic or category, a content format comprising a designation of one of text or graphics, and one of an advertisement, a coupon, or a survey;
recording a user gesture with at least one gesture recording device associated with the mobile device, the user gesture initiated by a command;
determining one of a positive or a negative content-related preference and a strength of the preference from the user gesture, the strength of the preference corresponding to a speed of the user gesture;
storing the one of a positive or negative content-related preference; and
associating the content related preference with the one or more of the content parameters.

17. The method of claim 16 comprising:
recording a user gesture;
associating a preference indication with the recorded user gesture; and
storing the preference indication in association with the user gesture in a gesture analyzing module.

18. The method of claim 17 wherein determining a content-related preference from the gesture comprises using a stored preference indication associated with a gesture.

19. The method of claim 18 comprising associating a positive preference indication with a first user gesture, the positive preference indication reflecting desire of a user of the mobile device to receive content corresponding to the content-related preference.

20. The method of claim 19 comprising associating a negative preference indication with a second user gesture, the negative preference indication reflecting desire of a user of the mobile device to not receive content corresponding to the content-related preference.

* * * * *